United States Patent [19]

Aoki et al.

[11] 4,324,759
[45] Apr. 13, 1982

[54] APPARATUS FOR TREATING WASTE GAS BY IRRADIATION WITH ELECTRON BEAMS

[75] Inventors: Shinji Aoki, Tokyo; Ryuichi Ishikawa, Yokohama; Yasuhiro Sawada, Fuchu, all of Japan

[73] Assignees: Ebara Corp; Japan Iron and Steel Federation, both of Tokyo, Japan

[21] Appl. No.: 150,941

[22] Filed: May 19, 1980

[30] Foreign Application Priority Data

Jul. 11, 1979 [JP] Japan .................... 54/87578

[51] Int. Cl.³ .................. B01D 53/34; B01J 12/02; B01J 19/08; F23J 15/00
[52] U.S. Cl. ..................... 422/62; 422/111; 422/169; 422/186
[58] Field of Search ............ 422/62, 111, 169, 168, 422/172, 186; 250/531, 527, 546

[56] References Cited

U.S. PATENT DOCUMENTS 3,869,362 3/1975 Machi et al.
4,188,190 2/1980 Muraki et al. ............... 422/111
4,208,383 6/1980 Kisters et al. ............... 422/111

FOREIGN PATENT DOCUMENTS 2902706 7/1979 Fed. Rep. of Germany ...... 422/111
48-17471 3/1973 Japan .
48-106701 9/1973 Japan .
49-93268 1/1974 Japan .
51-107270 3/1975 Japan .................... 422/111
52-140499 11/1977 Japan .

OTHER PUBLICATIONS

59–Air Pollution, Ind. Hyg.; vol. 88; 1978; No. 88:157829s.

Primary Examiner—Bradley Garris
Attorney, Agent, or Firm—Howard L. Rose

[57] ABSTRACT

There is disclosed an apparatus for treating waste gas containing nitrogen oxides and sulfur dioxide by irradiation with electron beams with the addition of ammonia, which apparatus comprises a reactor having an inlet and an outlet for the waste gas and a window through which electron beams pass to irradiate the waste gas inside the reactor, an electron beam accelerator as a source of said electron beams and a dust collector which receives the irradiated waste gas and removes solid particles therefrom, characterized in that said apparatus further comprises two independently operating automatic controlling systems and a judging system; the first controlling system operates under normal conditions; the second controlling system operates only in the case of emergency when the judging system has detected abnormal changes with respect to the concentrations of $NO_x$, $SO_2$ and $NH_3$ of the waste gas.

5 Claims, 5 Drawing Figures

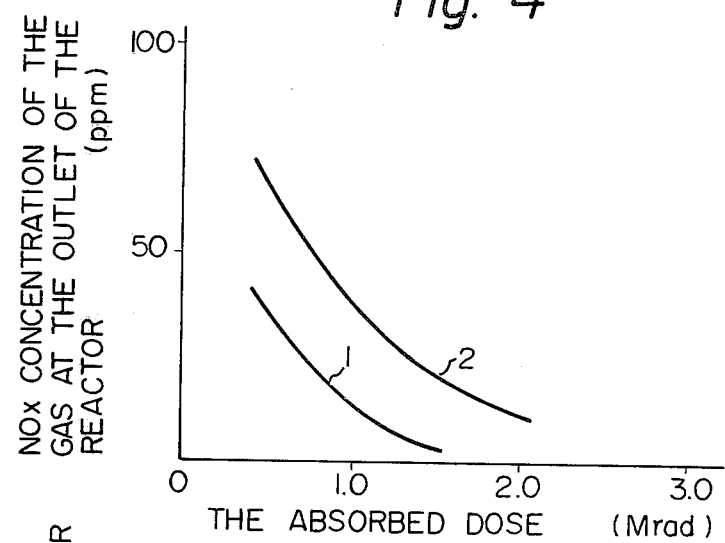
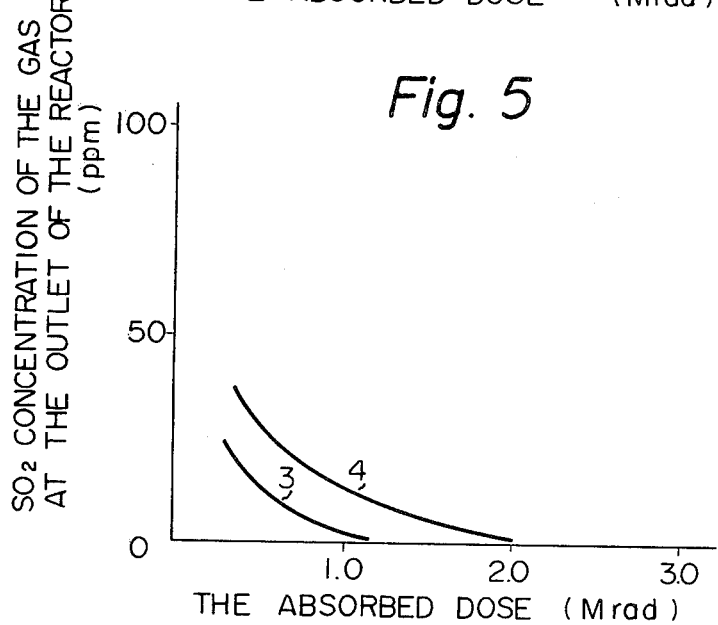

APPARATUS FOR TREATING WASTE GAS BY IRRADIATION WITH ELECTRON BEAMS

BACKGROUND OF THE INVENTION

This invention relates to an apparatus for carrying out by automatic control the process of treating waste gases containing nitrogen oxides ($NO_x$) and sulfur dioxide ($SO_2$) by irradiation and with the addition of ammonia ($NH_3$). An electron beam accelerator is generally used as a radiation source in the practice of this process.

Among the known waste gas purification processes which have been developed heretofore, there is one in which $NH_3$ is added to the waste gas containing $NO_x$ and $SO_2$ and the same gas is irradiated with electron beams to thereby convert $NO_x$ and $SO_2$ contained therein as small amounts of toxic gaseous components into minute solid particles which can be removed from the waste gas by a dust collector placed in the later stage. This process is carried out by introducing waste gas to which $NH_3$ has been added to a reactor, where the waste gas is irradiated through the "window for irradiation" of the reactor to convert the small amounts of toxic gaseous components to aerosol and then carrying the thus irradiated waste gas into a dust collector such as an electrostatic precipitator to thereby separate said aerosol.

For the successful practical operation of this process, it is required to control the amount of $NH_3$ to be added to the waste gas and also to control the dose rate of electron beams so that both said amount and said dose rate may meet the concentrations, which vary at every moment, of $NO_x$ and $SO_2$ of the waste gas to be treated.

Namely, for the continuous practical operation of this type of process, it is important to maintain the respective concentrations of $NO_x$, $SO_2$ and $NH_3$ of the treated waste gas within a certain limited range and thereby to minimize the consumption of $NH_3$ and the output of electron beams.

SUMMARY OF THE INVENTION

Thus, it is an object of this invention to provide an apparatus which enables the practical operation of said type of waste gas treating process in such a manner that the various conditions mentioned above may fully be satisfied.

The apparatus of this invention contains as its major components a reactor and a dust collector which are connected with each other in series, and it also contains additional components including an electron beam accelerator for irradiating the waste gas within the reactor with electron beams, equipment for providing ammonia to the waste gas which is introduced into the reactor and two independent automatic controlling units for controlling, respectively, according to the operational conditions, the amount of $NH_3$ to be added to the waste gas fed to the reactor and the amount of beam current in the electron beam accelerator.

BRIEF EXPLANATION OF THE DRAWINGS

FIG. 4 is a graph representing the absorbed dose (Mrad) and the $NO_x$ concentration of the gas at the reactor outlet determined under the specified conditions.

FIG. 5 is a graph representing the relationship between the absorbed dose (Mrad) and the $SO_2$ concentration of the gas at the reactor outlet (ppm) determined under the specified conditions.

DESCRIPTION OF THE PREFERRED EMBODIMENTS

Figure 1:
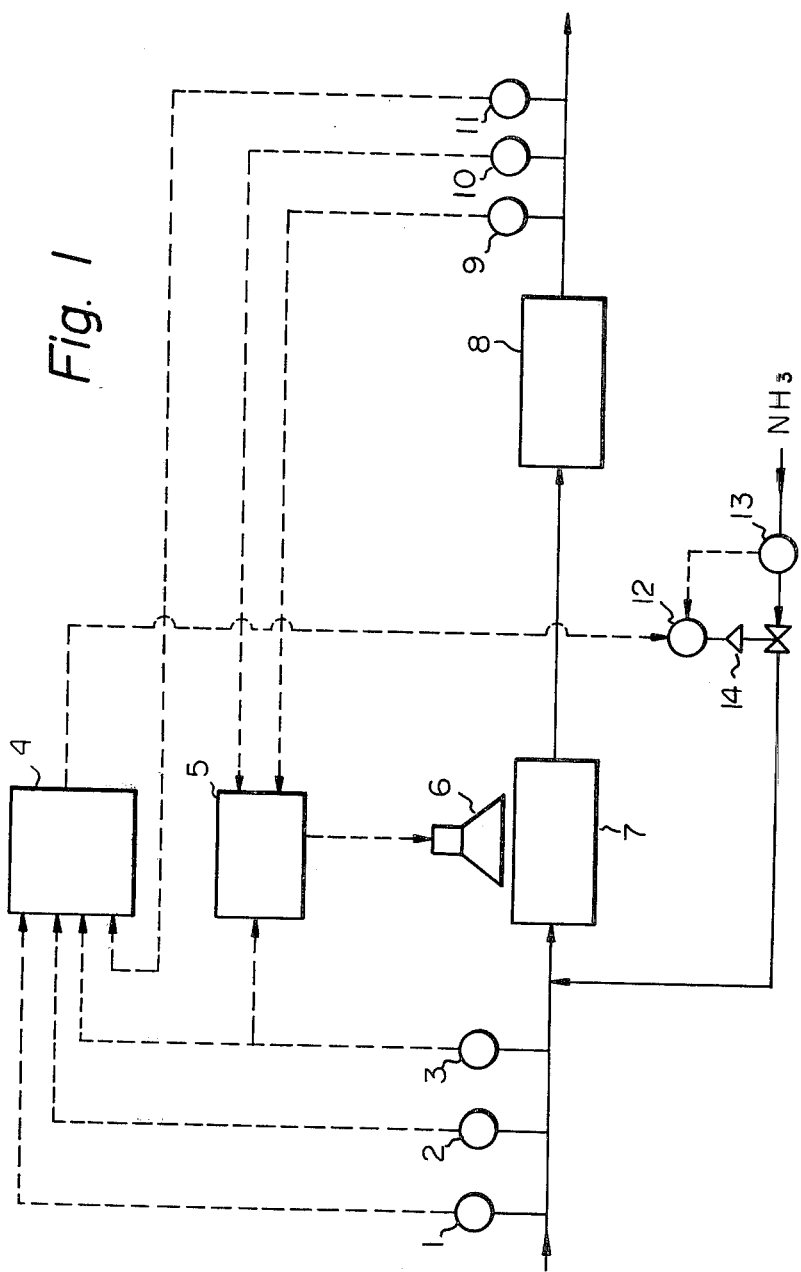
FIG. 1 is to illustrate the component parts and the controlling system of the electron beam irradiating waste gas treatment apparatus of the present invention and the operational flow chart of the waste gas treating process using the same apparatus.

Referring now to the attached drawing (FIG. 1), the reactor 7 is a vessel having an inlet for introducing untreated waste gas, a window through which electron beams pass and an outlet for discharging the irradiated waste gas.

The waste gas introduced in the vessel through the inlet thereof is subjected to irradiation with electron beams coming from the electron beam accelerator 6 and passing through the window given in the vessel. An appropriate amount of ammonia is also introduced into the reactor via the valve for adjusting the flow rate of $NH_3$, 14, which is controlled by the $NH_3$ flow rate-controller, 12.

The waste gas which has passed through the reactor is carried to the dust collector (such as an electrostatic precipitator) 8, wherein the waste gas is purified by the separation therefrom of the aerosol contained therein. The gas outlet of the reactor is connected to the gas inlet of the dust collector.

Each of the measurements of the $NO_x$ concentration, the $SO_2$ concentration and the flow rate of the waste gas before entering the reactor (hereinafter simply referred to as "gas at the inlet") determined, respectively, by the $NO_x$ analyzer 1, the $SO_2$ analyzer 2 and the flowmeter 3 is changed to an output signal which corresponds to each of said measurements. These signals are sent to the arithmetic unit (for calculating the desired amount of $NH_3$ to be added) 4.

Upon receipt of these signals, the arithmetic unit 4 calculates the proper amount of $NH_3$ to be added to the gas at the inlet and it sends the output signal corresponding to the calculated value to an ammonia-providing device which includes a flow rate control device for $NH_3$ 12 to control the amount of ammonia. On the other hand, the signal dispatched from the waste gas-flowmeter 3 is also sent to the arithmetic unit (for calculating the desired amount of electron beam current) 5, which calculates based on this signal the proper amount of current and the output signal corresponding to this current is sent to the electron beam accelerator. The strength of electron beams is controlled based on this signal. The system including the above-mentioned series of various controlling circuits is herein referred to as the first controlling system in the apparatus of this invention. In the normal state of the operation, this first controlling system actuates to maintain the proper operation.

The process of the present invention is characterized in that it contains the second controlling system which is independent from said first controlling system. The second controling system monitors the concentrations of $NO_x$, $SO_2$ and $NH_3$ of the waste gas which come out of the outlet of the reactor (this gas will hereinafter be simply referred to as the "gas at the outlet") and it operates in preference to said first controlling system only when at least one of said three concentrations has a value outside of the predetermined range of the concentration, namely only when an unusual change is observed in the operational process. Namely, the second controling system does not work when the operation is normal. In FIG. 1, the reference numbers 9, 10 and 11 represent the $NO_x$ analyzer, the $SO_2$ analyzer and the $NH_3$ analyzer, respectively and these constitute part of the second controlling system. In the case of FIG. 1, the analyzers are placed in such a manner that it is possible to analyze the gas coming from the outlet of the dust collector. However, the analyzers can be placed at any place so long as they are placed downstream of the reactor.

It is possible to use one and the same arithmetic unit for both the first and the second controlling systems. Thus, it is unnecessary to employ another unit for the second controlling system, though of course two units can be used separately for respective purposes if desired. The constitution and the function of the second controlling mechanism are the same as those of the first controlling mechanism except that it can send signals corresponding to the concentrations of $NO_x$ and $SO_2$ of the gas at the outlet to the arithmetic unit (for electron beam current) 5 and also can send the signal corresponding to the concentration of $NH_3$ of the gas at the outlet to the arithmetic unit (for the amount of $NH_3$) 4.

The actual controlling mechanism by the first controlling system works as follows.

(1) Control of the amount of $NH_3$ to be added:

Assuming that the concentrations of $NO_x$ and $SO_2$ of the gas at the inlet be $a_{NOx}$ and $b_{SO2}$, respectively, and the amount of the waste gas be Q, the amount of $NH_3$ to be added, $A_{NH3}$, can be calculated by the following equation:

$$A_{NH3} = K \cdot Q\ (a_{NOx} + 2\ b_{SO2}) \ldots \quad (1)$$

wherein K represents the constant of $NH_3$ addition, which may vary depending on the permitted limits specifically given for the concentrations of $NO_x$, $SO_2$ and $NH_3$, respectively, of the gas at the outlet.

(2) Control of electron beam current:

Depending on the change in the amount of gas at the inlet the calculation is effected according to the following equation:

$$I = C \cdot TD \cdot Q \ldots \quad (2)$$

and by the results thereof, the electron beam current is controlled, wherein I represents the electron beam current, TD represents the absorbed dose and C represents a device constant which is determined by the electron beam energy (eV) and the shape of the reactor.

The actual controlling mechanism by the second controlling system works as follows.

The concentrations of $NO_x$, $SO_2$ and $NH_3$ of the gas at the outlet are always being monitored, and when at least one of these concentrations is observed to have a value outside of the predetermined permitted range, a judgement mechanism works to give the instructive signal to start the second controlling mechanism functioning in preference to the first controlling system.

This controlling mechanism works according to the following procedures.

(1) In the cases when the concentration of $NH_3$ of the gas at the outlet is outside of the predetermined permitted range:

(a) The amount of $NH_3$ to add to the gas at the inlet is changed so that the concentration of $NH_3$ in the gas at the outlet may be kept within the predetermined permitted range. For example, if the $NH_3$ concentration of the gas at the outlet exceeds the predetermined permitted range, the amount of $NH_3$ to add is decreased until the $NH_3$ concentration of the gas at the outlet decreases to the upper limit of said predetermined permitted range of the $NH_3$ concentration. In the reverse case, the amount of $NH_3$ to add is increased until the $NH_3$ concentration of the gas at the outlet reaches the lower limit of said predetermined permitted range.

(b) After making the adjustment mentioned in the above item (a), if at least one of the $NO_x$ concentration and the $SO_2$ concentration of the gas at the outlet is outside of the predetermined permitted concentration range, the amount of electric current is adjusted so as to bring the concentrations of said components within the predetermined permitted range.

For example, if at least one of the $NO_x$ concentration and the $SO_2$ concentration of the gas at the outlet exceeds the predetermined permitted range for each of them, the amount of beam current is increased so that the $NO_x$ concentration or the $SO_2$ concentration of the gas at the outlet may be within the range of the predetermined permitted range. In the reverse case, the amount of beam current is decreased in the same manner as mentioned above.

(c) By repeating the adjustments mentioned in the above items (a) and (b), the amount of addition of $NH_3$ and the amount of electron beam current are adjusted until at last the concentrations of all components fall within the predetermined permitted range for the respective components.

(2) In the cases when the $NH_3$ concentration of the gas at the outlet is within the predetermined permitted concentration range and at the same time at least one of the $NO_x$ concentration and the $SO_2$ concentration of the gas at the outlet is outside of the predetermined permitted range for the respective components.

In these cases, one can repeat the procedures as mentioned in the abovementioned items (1)-(b) and (c).

As is obvious to those skilled in the art, the so-called "PID action" (proportional integral and derivative action) method can be employed as the second controlling system in the present invention.

One important advantage of using the apparatus of the present invention is that the time lag between the measurement of $NO_x$ and $SO_2$ concentrations and the flow rate of the waste gas and the adjustment of the operational conditions based on the results of said adjustment has been decreased remarkably as compared with when the prior art apparatus is used. This is because in the present invention only the first controlling system operates under the normal operational conditions based on the measurements of $NO_x$ and $SO_2$ concentrations and the flow rate of the waste gas determined at or before the inlet of the reactor, while in the prior art only the "feed back" type controlling system (which corresponds to the second controlling system in the present invention) is always working, and with such system substantial time lag is inevitably required with respect to the relationship between said measurement and said adjustment.

FIGS. 2 through 5 show some examples of the experimental results obtained by treating waste gas by making use of the apparatus of the present invention.

Figure 2:
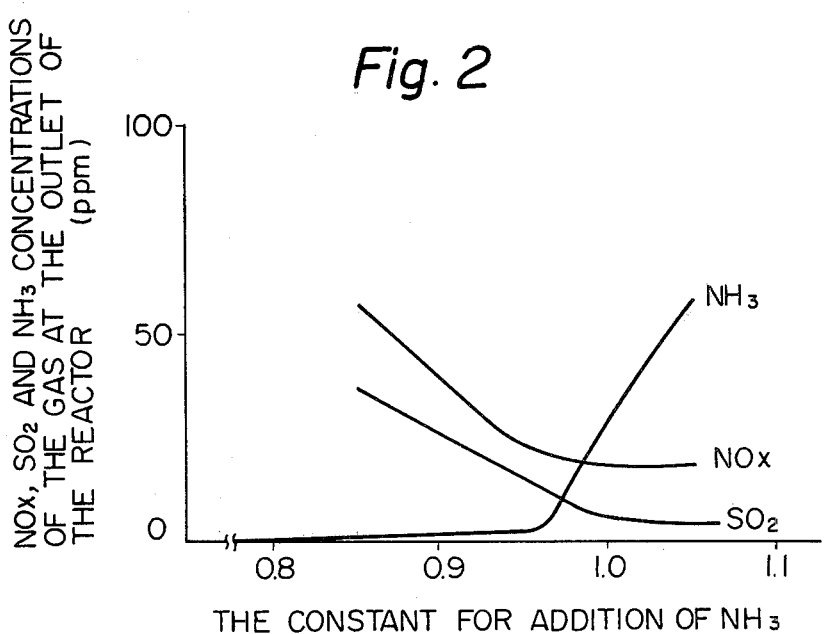
FIG. 2 is a graph representing the relationship between the amount of $NH_3$ added and the respective $NO_x$, $SO_2$, $NH_3$ concentrations of the gas at the reactor outlet determined under the specified conditions.

FIG. 2 is a graph which shows the relationship between the amount of $NH_3$ to add (in terms of "a constant for the addition of $NH_3$" in the equation) and each of the concentrations of $NO_x$, $SO_2$ and $NH_3$ of the gas at the outlet. The concentrations of $NO_x$ and $SO_2$ of the gas at the inlet were 200 ppm and 200 ppm, respectively. It is understood that in the embodiment as shown in FIG. 2, good results are obtained when the "$NH_3$ addition constant" is around greater than 0.95.

The reaction products obtained by the desulfurization and denitration process using the apparatus of the present invention are ammonium sulfate and ammonium sulfate-nitrate. It has been clarified that $SO_2$ contained in waste gas reacts with 2 equivalents of $NH_3$ to form ammonium sulfate or the ammonium sulfate component in ammonium sulfate-nitrate, and the $NO_x$ component in waste gas reacts with 1 equivalent of $NH_3$ to form the ammonium nitrate component in ammonium sulfate-nitrate. As is evident from the above explanation, it has been known that the reaction products are ammonium sulfate and ammonium sulfate-nitrate. Hence it is understandable that the amount of $NH_3$ to add to the waste gas depends on the total of ($NO_x$ content $+ 2 \times SO_2$ content).

It is also understood that based on the experimental results as shown in FIG. 2, the "constant for the addition of $NH_3$" can be determined from the values of the given permitted limits of the concentrations of $NO_x$, $SO_2$ and $NH_3$ of the gas at the outlet which have been determined in advance. Thus, the "constant for the addition of $NH_3$" given as "K" in the preceding equation (1) can be determined and according to this equation it is possible to calculate the amount of $NH_3$ to add to the waste gas in the course of operation.

Figure 3:
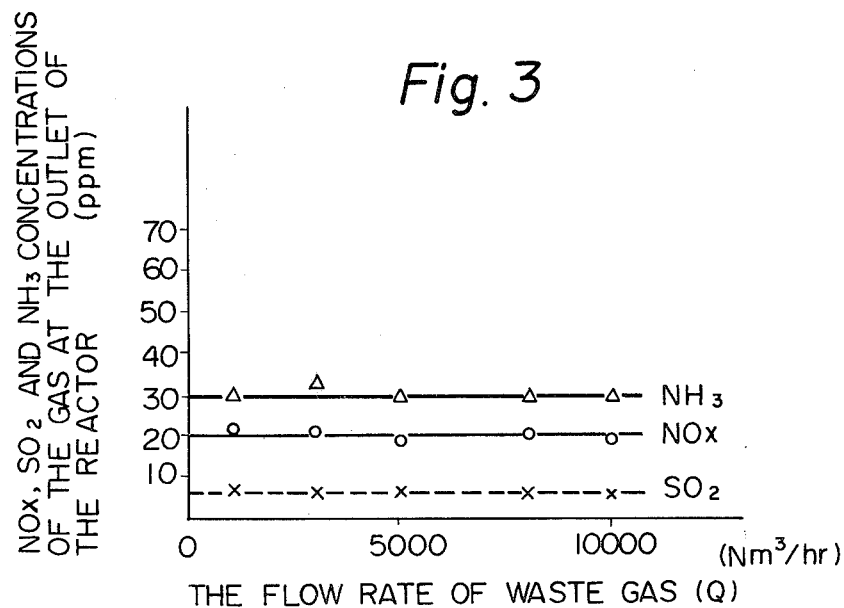
FIG. 3 is a graph representing the relationship between the flow rate of waste gas ($Nm^3/hr$) and the respective $NO_x$, $SO_2$ and $NH_3$ concentrators of the gas at the reactor outlet (ppm) determined under the specified conditions.

FIG. 3 is a graph representing the relationship between the flow rate of waste gas Q and the $NO_x$ content, the $SO_2$ content and the $NH_3$ content each of the gas at the outlet for the cases operated under the conditions of both the $NO_x$ content and the $SO_2$ content of the gas at the inlet being 200ppm, the constant (coefficient) for the addition of $NH_3$ being 1.0 and I/Q being approximately equal to ($\approx$) 0.01 mA/Nm$^3$/hr. FIG. 3 shows that when $NO_x$ content and the $SO_2$ content each of the gas at the inlet is constant and only the flow rate of waste gas varies, the degree of removal of $SO_2$ and $NO_x$ can be held constant, providing the beam current of electron beam accelerator per unit amount of gas is kept constant. Namely, it has been confirmed that in the process of treating waste gas by making use of the apparatus of the present invention, satisfactory operation can be ensured only by adjusting the amount of electron beam current in proportion to the varying amount of waste gas, providing the amount of waste gas is the only one variable in the operation of the process. The current required can be determined according to the equation:

$$I = C_1 Q$$

wherein $C_1$ is a constant.

FIG. 4 is a graph representing the relationship between the absorbed dose (Mrad) and the $NO_x$ content (ppm) of the gas at the outlet determined with respect to each of the cases wherein waste gases containing 200 ppm of $SO_2$ and 100 ppm or 200 ppm of $NO_x$ are treated under the conditions including the condition that the constant for the addition of $NH_3$ is equal to 1.0. It is obvious from FIG. 4 that the necessary absorbed dose or total dose (TD) varies depending on the $NO_x$ and $SO_2$ concentrations of the gas at the inlet, namely, the lower the $NO_x$ and the $SO_2$ concentrations, the less the required absorbed dose. By reference to FIG. 4, the curve 1 represents the case wherein the $NO_x$ concentration is 100 ppm and the curve 2 the case wherein the $NO_x$ concentration is 200 ppm.

FIG. 5 is a graph representing the relationship between the absorbed dose (Mrad) and the $SO_2$ concentration of the gas at the outlet determined with respect to each of the cases wherein waste gases containing 200 ppm of $NO_x$ and 100 ppm or 200 ppm of $SO_2$ are treated under the conditions including the condition that the constant for the addition of $NH_3$ is equal to 1.0. It is obvious, as in the case of FIG. 4, that the lower the concentrations of such components, the smaller the absorbed dose that is necessary.

By reference to FIG. 5, the curve 3 represents the case wherein the $SO_2$ concentration is 100 ppm and the curve 4 the case wherein the $SO_2$ concentration is 200 ppm.

The total dose (TD) means the dose of radiation absorbed by the waste gas. It has been revealed that there exists the following relationship between the amount of waste gas and the electron beam current:

$$TD = C_2 \cdot (I/Q)$$

wherein $C_2$ is a constant. From the equation given above, the electron beam current, I, can be obtained according to the following calculation:

$$I = k \cdot TD \times Q$$

wherein $k = 1/C_2$. It is evident from this equation that if the electron beam current I is always being adjusted depending on the varying concentrations of $NO_x$ and $SO_2$, the operation of treating waste gas can be maintained constant. In fact, however, the $NO_x$ and $SO_2$ concentrations of various waste gases generated from iron making plants, power plants, etc., change every second depending on the changes in the sulfur content of the fuel used, burning conditions of the fuel and other operational conditions. In addition the changing pattern is by no means simple. For example, sometimes the concentration of both $NO_x$ and $SO_2$ changes, while sometimes only either of said two changes. Thus, the equation for calculating the necessary electron beam current based on the signals corresponding to the $NO_x$ and $SO_2$ concentrations of the gas at the inlet is generally complicated and the arithmetic unit useful for such purpose is costly. In contrast, any of the equations of operation used in the controlling system of the apparatus of this invention is relatively simple, and yet, by properly selecting depending on the operational conditions either of said first and second controlling system, it is possible to control the operation in such a manner that always the minimum necessary amount of $NH_3$ and amount of beam current are provided.

In actually designing the apparatus of treating waste gas of the present invention, the following matters should also be taken into consideration so that the most rational design may be ensured.

(1) Each of the first and the second controlling systems independently contains both an arithmetic unit for calculating the necessary amount of ammonia and another arithmetic unit for calculating the necessary amount of beam current.

Alternatively, each of the two arithmetic units, one for ammonia and one for beam current, respectively, can serve a double purpose, namely, each of the two units for the respective purposes can serve the same purpose for both in the first and in the second controlling systems.

(2) The inlet of $NH_3$ can be given in any portion of the duct for waste gas so long as it is placed downstream of the points at which the $NO_x$ content, the $SO_2$ content and the flow rate of the waste gas at the inlet of the reactor are measured but upstream of the inlet of the dust collector.

(3) The judging (or sensing) system can be placed in any of the following four positions.

(i) When a pair of the arithmetic units 4 and 5, one for controlling the amount of ammonia and one for controlling electron beam current, respectively, are used each for a double purpose to serve both in the first and in the second controlling systems, the judging system is to be set in each of the units 4 and 5.

(ii) When a pair of the arithmetic units 4 and 5 are used in the first controlling system and another pair of the arithmetic units 4' and 5' are used in the second controlling system, respectively, the one judging system should be set in each of the units 4' and 5' placed in the second controlling system.

(iii) The judging systems can be equipped independently to make them operate in preference to the first controlling system.

(iv) The fourth alternative is to install an electron beam current judging system in the $NO_x$ analyzer for the gas at the outlet 9, to install another electron beam current judging system in the $SO_2$ analyzer for the gas at the outlet 10 and to install an ammonia content judging system in the $NH_3$ analyzer for the gas at the outlet 11.

IN the apparatus of the present invention, the first controlling system is an interlocking device which comprises (a) means for measuring, respectively, the concentrations of $NO_x$ and $SO_2$ as well as the flow rate of the waste gas to be introduced into the reactor; (b) means for converting the measured values into output signals which correspond to said measurements, respectively; (c) an arithmetic unit for ammonia which can receive said output signals and calculate therefrom the proper amount of ammonia to add to the waste gas through the $NH_3$ inlet and send the output signal corresponding to said proper amount of $NH_3$, said $NH_3$ inlet being situated in the passage of the waste gas downstream of the points at which the concentrations of $NO_x$ and $SO_2$ as well as the flow rate of the waste gas are measured but upstream of the inlet of the dust collector; (d) means for supplying ammonia which can receive the output signals from said arithmetic unit for ammonia to open and close a valve for supplying $NH_3$ in order to send the proper amount of ammonia to said $NH_3$ inlet; (e) an arithmetic unit for electron beam current which can receive the output signal corresponding to only the flow rate of the waste gas to be fed into the reactor to calculate the proper value of the electron beam current which is converted into the corresponding output signal to be sent to the electron beam accelerator; and (f) electron beam accelerator which can receive the signal from said arithmetic unit for electron beam and give electron beams at a proper dose rate to irradiate the waste gas inside the reactor.

The second controlling system is an interlocking device comprising (a) means for measuring the concentrations of $NO_x$, $SO_2$ and $NH_3$ of the waste gas which has left the reactor; (b) means for converting these measured values into the respective corresponding output signals; (c) an arithmetic unit for ammonia which can selectively receive the signal corresponding to the concentration of $NH_3$ out of said three signals in order to calculate the proper amount of ammonia to add and send the output signal corresponding to said calculated value of ammonia; (d) means for supplying ammonia which can receive said signal from said arithmetic unit for ammonia to thereby open and close a valve given in the ammonia supplying passage in order to send the proper amount of $NH_3$ to said $NH_3$ inlet; (e) an arithmetic unit for electron beam current which can selectively receive the signals corresponding to the concentrations of $NO_x$ and $SO_2$ out of said signals in order to calculate the proper value of electron beam current and send the output signal corresponding to said calculated value to the electron beam accelerator and (f) an electron beam accelerator which can receive the signal from said arithmetic unit for ammonia to give electron beams at a proper dose rate to the waste gas inside the reactor.

The second controlling system mentioned above can operate according to the instructions from said judging mechanism in preference to the first controlling system, only when an abnormal change has been observed in the process, namely, when at least one of the concentrations of $NO_x$, $SO_2$ and $NH_3$ of the waste gas in the downstream of the outlet of the reactor is outside of the predetermined range.

In the normal conditions, namely when all the concentrations of $NO_x$, $SO_2$ and $NH_3$ of the gas at the outlet are within the predetermined range, only the first controlling system works and the second controlling system does not.

What is claimed is:

1. An apparatus for treating waste gas containing nitrogen oxides ($NO_x$) and sulfur dioxide ($SO_2$) by irradiation with electron beams and with the addition of ammonia ($NH_3$), which apparatus comprises:

a reactor having a gas inlet through which the untreated waste gas is introduced, a window through which electron beams are irradiated and a gas outlet through which the irradiated gas is delivered;

a dust collector having a gas inlet which is connected to the gas outlet of said reactor and a gas outlet through which the gas purified by the dust collector passes;

an electron beam accelerator which generates electron beams which pass through the window of the reactor and are absorbed by the waste gas in the reactor;

means for adding ammonia to said waste gas;

means for measuring the concentration of $NO_x$ and $SO_2$ and the flow rate of the waste gas;

first controlling system for automatically controlling both the amount of ammonia added to the waste gas and the electron beam current depending on the normal changes of the respective $NO_x$ and $SO_2$ concentrations and the flow rate of the waste gas at or before the reactor inlet;

a second controlling system for automatically controlling both said amount of ammonia and said amount of electron beam current in response to the abnormal changes of the respective $NO_x$, $SO_2$ and $NH_3$ concentrations of the waste gas which has left the outlet of the reactor;

a judging system which can instruct to make the second controlling system start operating only when any of the $NO_x$, $SO_2$ and $NH_3$ concentrations of the waste gas which has left the outlet of the reactor is outside of a predetermined range so that the second controlling system may operate preferentially over the first controlling system; and an inlet for $NH_3$ which is given in the passage of the waste gas lying between (1) the point where said means for measuring the concentration of $NO_x$ and $SO_2$ and the flow rate of the waste gas are installed and; (2) the inlet of said dust collector, characterized in that said second controlling system can operate according to the instructions from said judging system only when at least one of the concentrations of $NO_x$, $SO_2$ and $NH_3$ of the waste gas in the downstream of the outlet of the reactor is outside of the predetermined range.

2. Apparatus for removing $NO_x$ and $SO_x$ from flue gases comprising means for subjecting the flue gases to ionizing radiation;

a flow path directing flue gases to said first means;

means for adding $NH_3$ to said flue gases;

first means for measuring the flow rate of flue gases;

second means for measuring the concentration of $NO_x$ in said flue gases in said flow path;

third means for measuring the concentration of $SO_x$ in said flue gases in said flow path;

means responsive to said first, second and third means for controlling the addition of $NH_3$ to said flue gases, and means responsive only to that measurement of gases in said flow path provided by said first means for controlling the dosage of ionizing radiation to which the flue gas is subjected.

3. The apparatus according to claim 2 further comprising fourth means for measuring the concentration of $NO_x$ and $SO_x$ in the flue gases treated with $NH_3$ and by ionizing radiation;

fifth means for measuring the concentration of $NH_3$ in the treated flue gases;

means responsive to the measurements made by said fourth means exceeding predetermined limits for overriding said means responsive to said first means to vary said electron beam current to reduce the quantities of $NO_x$ and/or $SO_x$ in the flue gas, and means responsive to measurements made by said fifth means exceeding a predetermined maximum for overriding said means responsive to said second and third means to reduce the quantity of $NH_3$ added to the flue gas.

4. The apparatus according to claim 3 further comprising a dust collector connected to receive the treated flue gases;

said fourth and fifth means being downstream of said dust collector.

5. The apparatus according to claim 4 wherein said $NH_3$ is introduced into said system between said first and second means and said dust collector.

* * * * *